Figure 1:
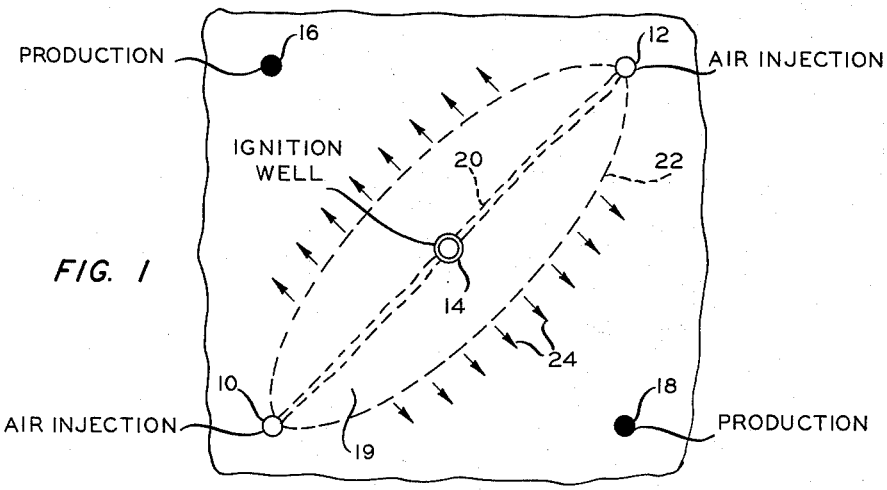

Jan. 26, 1965 M. SANTOURIAN 3,167,117
PRODUCING OIL FROM AN OIL-BEARING STRATUM
HAVING HIGH DIRECTIONAL PERMEABILITY
Filed Feb. 8, 1963

INVENTOR.
MELCON SANTOURIAN

BY

*Young & Quigg*

ATTORNEYS

United States Patent Office 3,167,117
Patented Jan. 26, 1965

3,167,117
PRODUCING OIL FROM AN OIL-BEARING STRATUM HAVING HIGH DIRECTIONAL PERMEABILITY
Melcon Santourian, Bartlesville, Okla., assignor to Phillips Petroleum Company, a corporation of Delaware
Filed Feb. 8, 1963, Ser. No. 257,288
12 Claims. (Cl. 166—2)

This invention relates to a method or process for producing oil by fluid drive. A specific aspect of the invention pertains to the production of oil from an oil-bearing stratum having high directional permeability.

The production of oil from an oil-bearing stratum by fluid drive has been practiced for a considerable time. Various gases and liquids have been utilized as the driving fluid which is injected thru one or more injection wells toward one or more producing wells thru which the oil is produced. In situ combustion, which is in use in producing oil, is also a modified fluid drive process in that the injected combustion-supporting gas (air) and the resulting combustion gases and oil vapor and liquid sweep the formation and drive additional hydrocarbons into the production well(s).

This invention is concerned with a flud drive process for use in an oil-bearing stratum which has high directional permeability. To illustrate, the Burkett Field in Greenwood County, Kansas, is highly permeable from northeast to southwest, and vice versa, but has considerably less permeability at right angles to this direction or along a line from northwest to southeast. Other known fields have relatively high permeability in one direction and substantially lower permeability in a direction at right angles to the line of high permeability.

Accordingly, it is an object of the invention to provide an improved fluid drive process for producing oil from an oil-bearing stratum having high directional permeability. Another object is to provide a more efficient method than conventionally used in producing oil from an oil-bearing stratum of high directional permeability. A further object is to provide an effective process for producing oil from an oil-bearing stratum of high directional permeability by in situ combustion. Other objects of the invention will become apparent to one skilled in the art upon consideration of the accompanying disclosure.

A broad aspect of the invention as applied to an oil-bearing stratum having high directional permeability comprises injecting a driving fluid thru an injection well and producing fluid from the stratum thru a production well in line with the high directional permeability of the stratum. Another aspect of the invention comprises injecting air or other combustion-supporting gas, such as oxygen-enriched air or diluted air, thru a pair of wells in a conventional ring pattern, such as a 5-, 7-, or 9-spot well pattern, on the line of directional permeability and producing fluids thru the center well (which is substantially on the same line) at least until air is being produced thru the center well at a sufficient rate to sustain in situ combustion around the center well. Ignition is then effected around the center well in conventional manner, such as heating the stratum to combustion-supporting temperature and contacting same with air or other combustion-supporting gas. This may be accomplished by air injected thru the injection wells or by air injected temporarily thru the center well. In either event, the resulting combustion zone is moved into the stratum from the central well by feeding air to the combustion zone from the two injection wells. After the combustion zone has been moved into the straum a substantial portion of the distance to the injection wells, the central well is closed and a production well(s) on each side of the line running thru the injection wells is opened to production so that fluids produced by the combustion, including oil, are recovered thru these production wells.

It is preferable to continue injection of air thru the injection wells until the combustion zones moving toward these injection wells arrive at or in the vicinity of the injection wells before closing the central well and opening the production wells (other wells in the ring). Continuation of injection of air thru the injection wells at a rate above about 20 standard cubic feet per square foot of cross section of stratum (s.c.f.h./ft.$^2$) continues to move the combustion zones toward the injection wells. However, reduction of the injection rate below the aforesaid rate causes the combustion zones to reverse direction and travel toward the central well. By closing the central well, the combustion zones will be driven out into the stratum substantially at right angles to the line of the injection wells which corresponds to the line of directional permeability of the stratum. By continuing the injection of air by reversal of the combustion zones, the fire fronts or combustion zones are moved to the vicinity of the production wells.

The technique just described greatly reduces "fingering" which is a problem in fluid drive process and is well recognized as such in the production art. The process of the invention utilizes the high permeability in one direction in a field to rapidly establish and move a combustion zone thru a selected area of the stratum between injection wells and then drives the combustion zone(s) generally at right angles to the line of high permeability so that the progress of the fire front is somewhat uniform with respect to what it would be if driven simultaneously both along the line of high permeability and in other directions with respect thereto.

Figure 2:
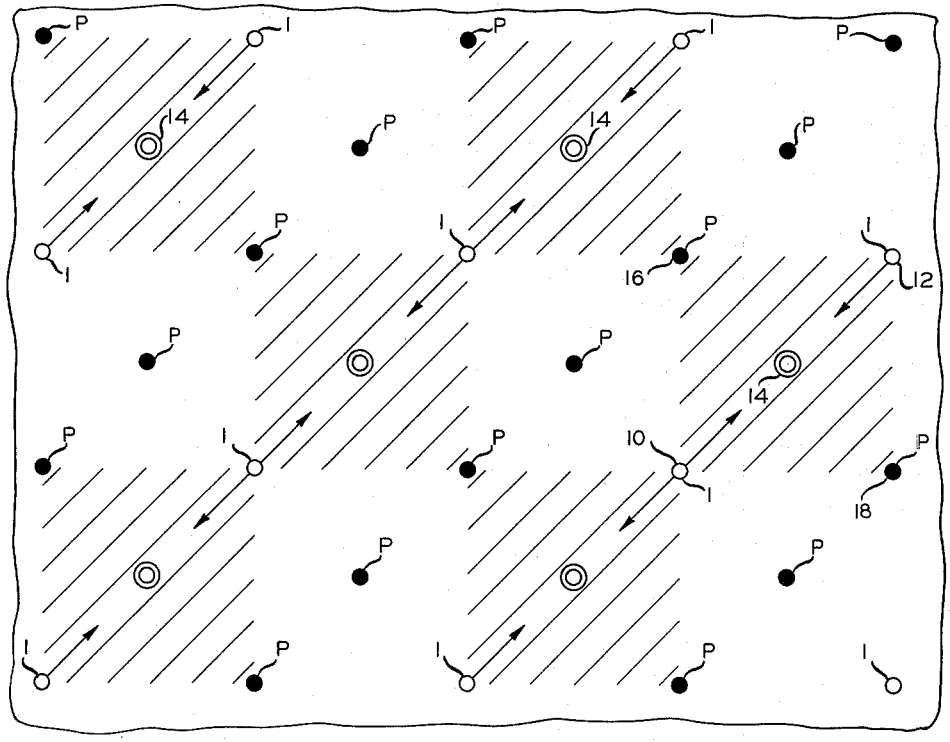

A more complete understanding of the invention may be had by reference to the accompanying schematic drawing of which FIGURE 1 is a plan view of a 5-spot well pattern in use in producing in accordance with the invention and FIGURE 2 is a plan view of the well pattern of FIGURE 1 applied to a substantial section of an oil field.

Referring to FIGURE 1, an oil field having relatively high directional permeability along the line of injection wells 10 and 12 is penetrated by 5 wells in a conventional 5-spot pattern including center well 14 and production wells 16 and 18. In operation with this well pattern, air or other driving fluid is injected thru wells 10 and 12 and the injection is continued until breakthru at well 14 occurs, production wells 16 and 18 being closed-in during this period. Water and/or oil may be produced thru well 14 during the initial fluid injection phase of the process, depending upon the nature of the oil-bearing stratum. In application to a tar sand, little or no oil is produced during this phase of the process; however, in a stratum containing free liquid oil, there will be substantial production of oil during the initial phase of the process.

In the event air is utilized as the injection fluid and in situ combustion is to be utilized for producing oil, the injection of air is continued with production only thru well 14 until air is produced at a combustion-supporting rate of at least 20 s.c.f.h./ft.$^2$. At this time the stratum is ignited around well 14 by conventional means, such as heating the stratum adjacent the well bore to ignition temperature and feeding air thru the stratum from the injection wells to the hot area. To facilitate ignition and combustion, a small concentration of fuel gas, such as natural gas, is introduced into the injected air. This fuel gas inclusion in the injected air may be continued at about 1 to 3 weight percent of the mixture during the entire burning phase of the process but it is not essential thereto. However, its inclusion does contribute to the speed of recovery and to the quantity of oil recovered from the stratum.

The continued injection of air thru wells 10 and 12, after ignition is commenced, causes the resulting combustion zones to move into the stratum from well 14 toward wells 10 and 12. Continued injection of air moves the combustion zones to the injection wells and develops a partially burned out zone 19 bounded by fire front 22. Closing of well 14 and continuation of air injection thru wells 10 and 12, while producing thru wells 16 and 18, results in movement of the fire front and combustion zones outwardly from the line of wells 10, 12, and 14 toward production wells 16 and 18 as shown by arrows 24. Continuation of air injection either with or without added fuel gas moves the fire front to the production wells and effects a substantially clean sweep of the well pattern.

It is feasible to stop the movement of the combustion zones toward the injection wells at any time and reverse the movement toward well 14. By closing well 14 after reversal and opening wells 16 and 18 to production, the combustion zones are driven outwardly toward the production wells but the sweep of the well pattern is not so complete as that obtained by forming the combustion zone, as shown in FIGURE 1, extending to the injection wells.

In FIGURE 2 the 5-spot well pattern of FIGURE 1 is applied to a large section or all of an oil field in which high permeability runs along the lines shown in the pattern. The central wells in alternate patterns (lined patterns) correspond to well 14 of FIGURE 1 and the central wells of the unlined patterns are utilized as production wells as shown. In this figure, P denotes production wells and I denotes injection wells. Production thru wells P occurs when wells 16 and 18 are opened to production, all flow being substantially at right angles to the direction of high permeability.

The directional permeability may be caused by natural fractures extending thru the formation or by naturally higher permeability in a given direction in the field. Fracture 20 illustrates a fracture, either artificial or natural, extending along the line of wells 10, 12, and 14, which functions as a line of high permeability. Induced fractures may be utilized thruout the well pattern.

While in situ combustion has been applied to the well pattern in FIGURE 1 in the foregoing description, it is feasible to use water flooding or gas drive or miscible fluid drive in a similar manner to produce the well pattern. The injected fluid is driven thru the stratum from injection wells 10 and 12 to well 14 with wells 16 and 18 closed in. At breakthru at well 14, this well is closed and wells 16 and 18 are opened to production so that the flow of fluid is now generally at right angles to the line of high permeability, i.e., the line of wells 10, 12, and 14. Injection is then continued until breakthru at wells 16 and 18 is effected. If breakthru occurs first at either wells 16 or 18, this well is shut in until breakthru at the other corner production well occurs. In this manner fingering to any substantial degree is avoided and a complete sweep of the pattern is effected.

Certain modifications of the invention will become apparent to those skilled in the art and the illustrative details disclosed are not to be construed as imposing unnecessary limitations on the invention.

I claim:

1. A process for producing oil from an oil-bearing stratum having high directional permeability, said stratum being penetrated by a central well and a surrounding ring of at least 4 wells which comprises the steps of
   (1) selecting as injection wells a pair of ring wells substantially diametrically opposite each other and in line with said directional permeability;
   (2) injecting air thru said injection wells and producing only thru said central well until air is being produced at a combustion-sustaining rate;
   (3) thereafter, igniting said stratum adjacent said central well and continuing the injection of air thru said injection wells so as to move inverse burning combustion zones into said stratum toward each injection well;
   (4) thereafter, closing said central well and opening at least one ring well on each side of the line of injection wells as production wells; and
   (5) continuing injection of air thru said injection wells so as to continue combustion in said stratum and produce thru said production wells.

2. The process of claim 1 wherein air is injected thru said injection wells in step 3 until combustion zones are adjacent the injection wells and movement of said zones is reversed so as to drive same toward said production wells by continued injection of air thru said injection wells.

3. The process of claim 1 wherein the inversely burning combustion zones of step 3 are reversed to direct burning zones by reducing the rate of feeding air thereto below about 20 standard cubic feet per hour per square foot of cross section of stratum and resuming air injection at a rate above said rate before same reach said injection wells and said zones are driven toward said production wells in step 5.

4. The process of claim 1 wherein oil is produced in said central well and recovered therefrom in step 2.

5. A process of producing oil from an oil-bearing stratum having high directional permeability thru a five-spot well pattern penetrating said stratum which comprises the steps of
   (1) selecting as injection wells a pair of opposite corner wells substantially along the line of high permeability;
   (2) injecting air into said stratum thru said injection wells and producing only thru the central well of said pattern until air is being produced at a rate capable of supporting combustion of said stratum;
   (3) thereafter, igniting said stratum adjacent said central well to establish a combustion zone adjacent said well;
   (4) moving combustion zones toward each injection well by feeding air thru said stratum to said combustion zone from said injection wells;
   (5) closing said central well and opening the other corner wells as production wells when said combustion zones have moved at least a substantial portion of the distance to said injection wells;
   (6) continuing injection of air thru said injection wells so as to force same thru said stratum into said combustion zones; and
   (7) producing oil thru said production wells.

6. The process of claim 5 wherein said combustion zones are moved at least half the distance to said injection wells before closing said central well and opening the other corner wells as production wells.

7. The process of claim 6 wherein the direction of movement of said zones is reversed by reducing the rate of feeding air thereto below about 20 standard cubic feet per hour per square foot of cross section of stratum and resuming air injection at a rate above said rate.

8. A process for producing oil from an oil-bearing stratum penetrated by a central well and a surrounding ring of wells and having high directional permeability which comprises the steps of
   (1) injecting a driving fluid thru two selected wells of said ring substantially on the line of high permeability of the stratum along with said central well and producing only thru said central well until break thru at said central well is at least imminent;
   (2) thereafter, closing said central well and opening as production wells at least one well in said ring on each side of the line of said injection wells;
   (3) continuing the injection of said fluid thru said injection wells after step 2 so as to drive said fluid thru said stratum toward said production wells; and
   (4) recovering oil produced thru said central well and said production wells.

9. A process for producing oil from an oil-bearing stratum penetrated by a central well and a surrounding ring of wells which comprises the steps of
(1) fracturing said stratum vertically along a plane to connect generally opposite ring wells and said central well to increase the permeability of said stratum along said plane;
(2) injecting a driving fluid thru said opposite ring wells as injection wells and producing only thru said central well until break thru at said central well is at least imminent;
(3) thereafter, closing said central well and opening wells in said ring on each side of said line as production wells;
(4) continuing injection of fluid thru said injection wells after step 3 so as to drive said fluid thru said stratum toward said production wells; and
(5) recovering oil produced thru said production wells.

10. The process of claim 9 wherein said fluid is air, air is injected until same is being produced at a combustion-supporting rate in said central well, thereafter combustion is initiated in said stratum along the fracture, a combustion zone is moved along said fracture by injection of air thru at least one of the wells in said line so as to establish a combustion zone extending substantially from ring well to ring well in said line, and thereafter, steps 3–5 are performed.

11. The process of claim 10 wherein combustion is initiated at the ring wells in said line and air is injected thru said central well to move a combustion zone to said central well.

12. The process of claim 10 wherein combustion is initiated at the ring wells in said line and air is injected thru said ring wells to drive a combustion zone to said central well before closing said central well to production.

References Cited in the file of this patent
UNITED STATES PATENTS

| | | |
|---|---|---|
| 2,813,583 | Marx et al. | Nov. 19, 1957 |
| 2,970,826 | Woodruff | Feb. 7, 1961 |
| 3,057,403 | Wyllie | Oct. 9, 1962 |
| 3,113,616 | Dew et al. | Dec. 10, 1963 |